March 10, 1959 J. MAURICE ET AL 2,876,879
ELECTROMAGNETIC CLUTCHES
Filed July 21, 1953 9 Sheets-Sheet 7

# United States Patent Office 2,876,879
Patented Mar. 10, 1959

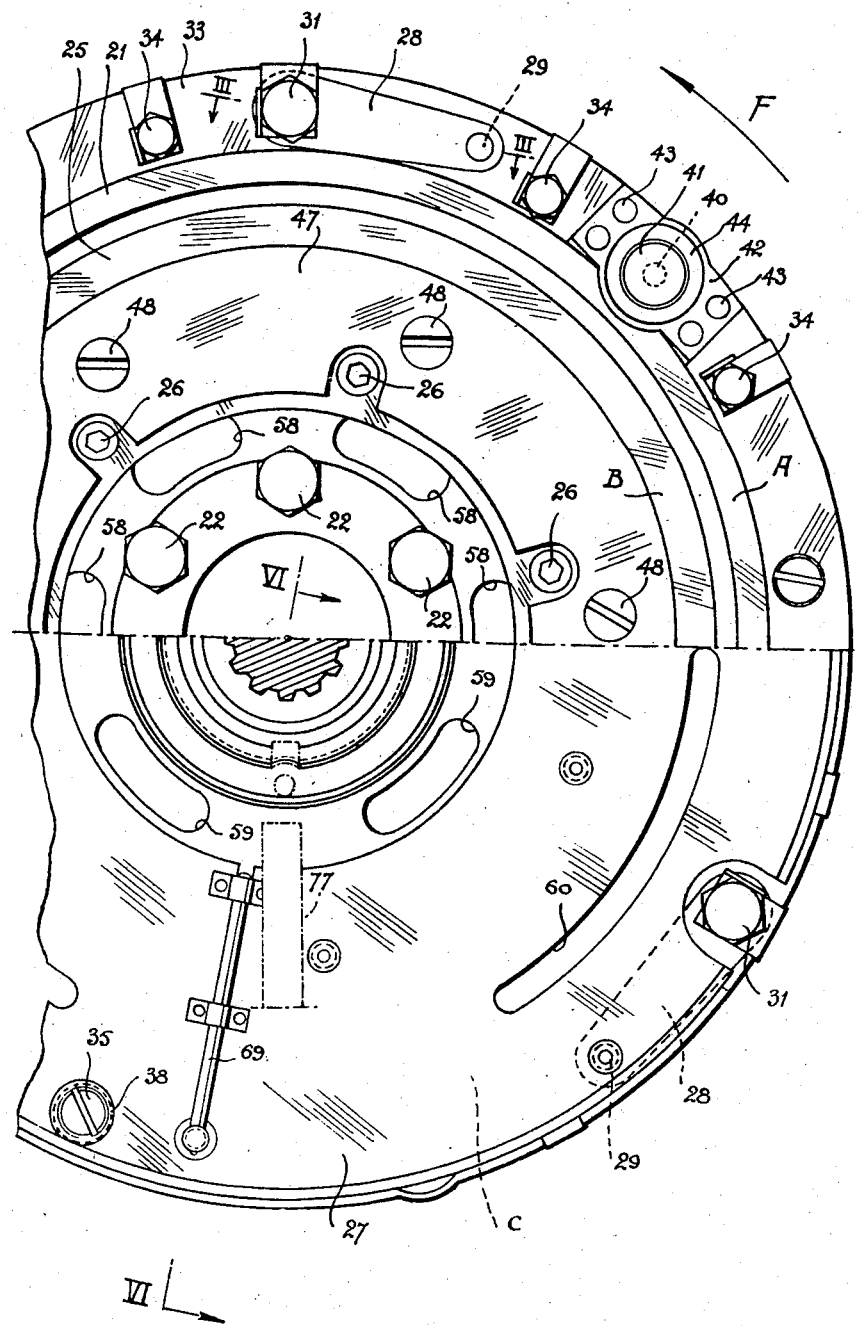

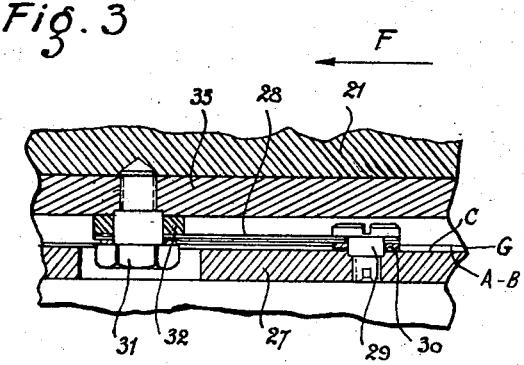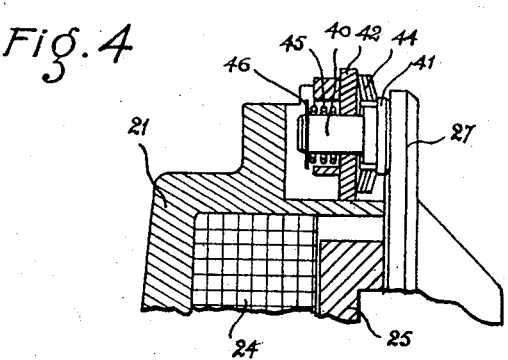

2,876,879

ELECTROMAGNETIC CLUTCHES

Jean Maurice, Ablon, and Michel Rist, Paris, France, assignors to Societe Anonyme Francaise du "Ferodo," Paris, France Application July 21, 1953, Serial No. 369,500

Claims priority, application France July 23, 1952

6 Claims. (Cl. 192—84)

The present invention relates to an electromagnetic clutch of the type in which one of the two shafts of the clutch namely, the driven shaft, is rotatively connected with at least one friction disc the two tightening plates of which are rotatively connected to the second shaft, for example the driving shaft, and are made to engage by the magnetic force created between the armature and the yoke of an electromagnet by the application of an electric current to the winding of this electromagnet, the yoke and the armature rotating coaxially in synchronism with the said second shaft and being solid, one with one of the plates, the other with the other plate.

The electromagnetic clutches of this type have numerous drawbacks which are troublesome in use. Among these drawbacks may be mentioned the parasitic influence of the magnetic circuit on the free axial displacement of the armature with respect to the yoke under the action of the magnetic field, a bad centering, a tendency to jamming, vibrations and serious difficulties in the working of the clutch at the end of a certain time of service.

The applicants have sought the cause of these various impediments and have ascertained that they arose in most part from the effect of wear of the frictional linings of the clutch on the behaviour of the clutch. In the electromagnetic clutches of the kind indicated above, the wear of the frictional linings, particularly if it is irregular, has in fact a considerable repercussion on the behaviour, the spacing apart, the centering and the free axial relative displacement of the yoke and of the armature connected to the tightening plates, a repercussion which is not found either in the usual mechanical clutches nor in the other types of electromagnetic clutches.

An essential object of the present invention is to obviate the drawbacks mentioned in an electromagnetic clutch of the type described and to provide various means which, used separately but preferably in combination, permit the efficacious working of the electromagnetic clutch without risks.

These means are of three principal kinds. The first means according to the invention consists in connecting the yoke and the armature in such a way that a rigorous relative centering and complete liberty of axial relative displacement is always ensured notwithstanding the wear, even irregular, of the frictional linings and the presence of dangerous factors such as the neighbourhood of a magnetic field, or cyclic variations of the torque applied to the clutch by the driving shaft. The second means according to the invention consists in rendering the attracting force of the armature towards the yoke and the conditions of application of this force substantially independent of the thickness of the frictional linings. The third means according to the invention consists in slowing down the wear itself of the frictional linings by an efficacious ventilation of the frictional surfaces both at engagement and at disengagement, and also by a special construction of the frictional linings.

According to a characteristic feature of the invention, the armature is directly harnessed to the yoke, so as to constitute with the latter an electromagnet block which is independent, whereas the armature and the yoke are rigorously centered one with respect to the other, with complete liberty of axial relative displacement. The direct harnessing of the armature to the yoke consists of flexible strips which are disposed, in the engaged position of the clutch, normally in the same transverse plane, making a small angle with the tangent to one of the circular zones limiting the gap, and which are distributed in number at least equal to three along the said circular zone. Each of the said strips have one end attached to the yoke and the other end to the armature, while a means of magnetic insulation is provided at at least one of the ends of each strip.

According to another characteristic feature of the invention, the means for rendering acceptable the wear of the frictional linings and for compensating the effects of this wear, consist in a gap capable of varying slightly according to the condition of wear of the frictional linings, but never becoming nil even after a protracted length of service and in one or several devices so arranged as to render efficiently constant the attracting force of the armature towards the yoke, whatever may be the width of the gap.

Furthermore, according to the invention, the induction existing in the magnetic circuit may be chosen so that the force of attraction varies relatively little with the gap. In the same manner and for rendering the conditions of application of this force normally independent of the width of the gap in order to insure the proper effect, the delay with which the tightening effort must begin, according to the invention is obtained, not by mechanical means which would be influenced by the width of the gap, but by electrical means which consist in imparting to the winding of the clutch a high time constant.

According to another characteristic feature, the means for slowing down the wear of the frictional linings consists in the passage of a current of air at the contact of the rubbing surfaces, which current of air, passing principally outside the gap, comes from a clear axial space and is forced back towards a surrounding free space, the friction disc having on its periphery vanes alternating with empty spaces, for causing the circulation of the current of air, in the manner of a fan, both at engagement and at disengagement.

Other objects, characteristic features and advantages of the invention will emerge from the following description of embodiments selected uniquely by way of examples, with reference to the accompanying drawings, in which:

Fig. 2 is a view showing on one half the yoke and on one half the armature, according to the arrows II—II of Fig. 1;

Fig. 3 is a view on a larger scale of a harnessing strip of the armature to the yoke, shown in section along the line III—III of the Fig. 2;

Fig. 4 is a partial view of a resilient arrangement opposing a resistance to the approach of the armature towards the yoke when the frictional linings are worn;

Figure 1:
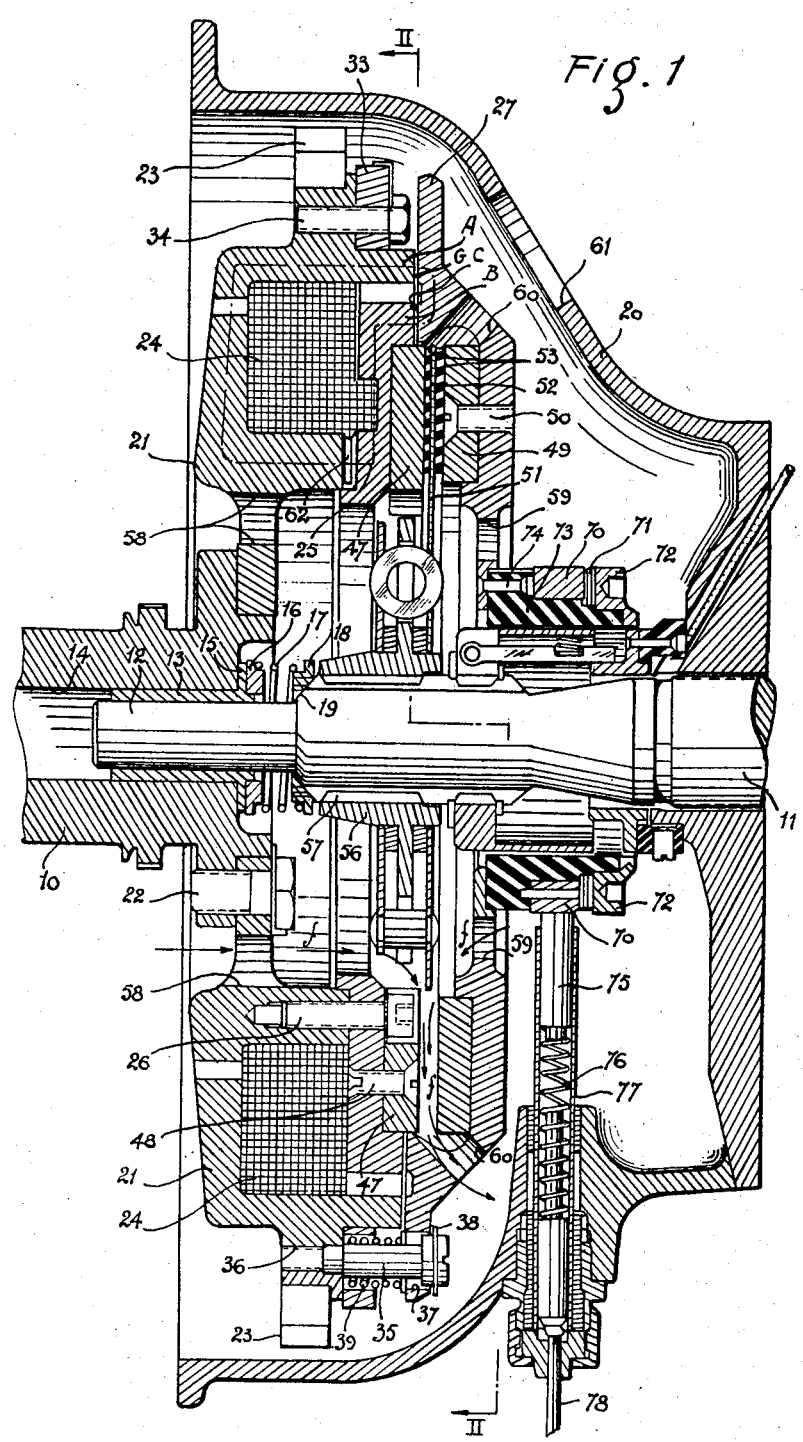
Fig. 1 is a longitudinal section of a clutch according to the invention, shown with a single disc.

In the embodiment represented in Figs. 1 to 6 which covers by way of example an application of the invention to the transmission of automobile vehicles by means of a clutch with a single disc, the driving shaft formed by the crankshaft of the motor is seen at 10 (Fig. 1), the driven shaft 11 forming the primary shaft of the gear-box.

The end 12 of the driven shaft 11 is engaged and centered by means of a self-lubricating bearing 13 in a bore 14 of the driving shaft 10. The bearing 13 is flanged at 15 outside the shaft 10 and a collar 16 is applied against the flange 15 by a spring 17 resting on a conical collar 18 carried around at 19 by the driven shaft 11 owing to its high coefficient of friction.

When the shafts 10 and 11 turn at different speeds, the friction torque which takes place between the flange 15 and the collar 16 tends to render uniform the speeds of these two shafts. It must be understood that this tendency is small and could not carry a shaft round owing to the fact that the other is rotating, but it is valuable in that it takes up all the plays which exist in the transmission of the vehicle. Particularly, it permits the starting of the vehicle without jerking it. It will be seen that the friction torque at 15—16 is constant and independent of the gap of the clutch.

The clutch is housed in a fixed casing 20 having the shape of a bell, which extends round the parts near the driving shaft 10 and the driven shaft 11.

The yoke or electromagnetic member 21 of the clutch, which acts as a flywheel, is fixed co-axially by a screw 22 at the end of the driving shaft 10 and carries on its periphery a toothed crown 23 serving to launch the motor by electrical starting. A co-axial winding in the form of an anchor-ring, 24, is housed in the yoke 21 and is maintained in position by a counter-plate 25 fixed to the yoke by a screw 26. The yoke and the counter-plate, 21 and 25, are made of steel of high permeability and form two annular concentric spaced poles A and B disposed near the periphery of the yoke. The faces of the poles A and B are substantially plane and perpendicular to the clutch axis. The movable armature 27 of the clutch is formed by a co-axial ring extending opposite the yoke 21 and the counter-plate 25. The armature member 27, constructed like the yoke of high permeability steel, comprises, opposite the faces of the poles A and B an annular zone C for closing the magnetic circuit. The pole face C is substantially plane and perpendicular to the clutch axis. The armature 27 is harnessed directly to the yoke in a solid manner rotatively but is free in longitudinal displacements limited in such a way as to form with the yoke an independent controlling block. Three strips 28 (Figs. 2 and 3) of spring steel, equally distributed along the periphery of the yoke, extend tangentially in said block between the yoke and the armature. As shown in Fig. 3, each strip 28 is substantially coplanar with the pole face A-B of the yoke 21. Each strip 28 is formed by a superposition of several elementary strips, for the purpose of increasing the flexibility for the working section. In the example shown, each of the three groups of strips comprises two adjacent strips. Each group of strips 28, further from the axis of the apparatus than the pole faces A-B and C is pivoted at one end by a screw 29 and washer 30, of brass, on the armature 27 and is pivoted at the other end by a screw 31 and a washer 32, of brass, in a crown 33. The latter is preferably of a magnetic material and is fixed by a screw 34 (Figs. 1 and 2) to the yoke 21. In a slightly modified form of construction, the pivot screws 31 may be mounted directly in the yoke by using screws of magnetic material or inserting any suitable magnetic insulator between each group of strips and the yoke or the armature.

The screws 31 mounted on the yoke are disposed in front of screws 29 mounted on the armature in the direction of rotation F (Figs. 2 and 3) of the driving shaft 10 or yoke 21, so that in the normal rotational movement of the armature by the yoke, the strips are in tension. Their tangential disposition causes them to be subjected to a minimum stress.

This arrangement with yoke-armature block and pivoted strips has the advantage over the prior construction of doing away with all friction due to a magnetization together with any vibrations. Besides, the armature is exactly centered with respect to the yoke and can, owing to the pivots of the strips, approach or recede from the yoke without notable torsional strain, so that complete freedom of axial displacement of the armature with respect to the yoke is always ensured even if the gap is not constant along its circumference. In this manner, a smooth and efficacious working is obtained.

The distance or gap G between the pole face C of the armature and the poles A and B of the yoke is limited between two predetermined values.

The maximum distance is determined (Figs. 1 and 2) by the small pins 35 equally distributed along the periphery of the yoke and screwed in the latter at 36. Each small pin 35 passes through a corresponding hole 37 provided in the armature, and comprises at the end a stop collar 38 in a predetermined position. A spring 39 is disposed around the small pin between the yoke and the armature and tends to separate the latter at the greatest distance in which the stop 38 is applied against the armature. A sufficient play is provided between the small pins 35 and the holes 37 in order that the dragging of the armature by the yoke is caused entirely by the strips 28.

The minimum distance is determined by the thickness of the frictional linings of the clutch inserted between the yoke and the armature, and hereinafter described in detail. This minimum distance or minimum gap G is provided so as to permit an instantaneous disengagement when the supply current of the winding 24 is cut off.

The electric circuit for the supply of the winding 24 together with the magnetic circuit shown in dot-and-dash lines in Fig. 1, are provided, according to the invention, so that for the maximum electric supply current of the winding the magnetic circuit should not be saturated, but has an induction comprised between 7,500 and 15,000 Gauss and advantageously between 9,000 and 12,000 Gauss, if the high permeability steel with which the armature and the yoke are made tends to become saturated for inductions comprised between 15,000 and 18,000 Gauss. Owing to this non-saturation, the force of attraction of the armature toward the yoke may be easily varied according to operating conditions, by a simple and convenient adjustment of the controlling circuit by means of resistances which are variable or which can be cut out at will, if desired. Besides, for such a selected value of the induction, comprised between 9,000 and 12,000 Gauss, the force of attraction varies relatively little as a function of the variations of the width of the gap, which allows to attenuate the effect of the wear of the frictional linings and to facilitate the bringing into action of means for compensating such a wear. Such means may be mechanical, electrical, or magnetic, or any combination thereof as will be seen hereinafter.

As shown in Figs. 2 and 4, the means are mechanical and comprise longitudinal pins 40 flanged at 41 and equally distributed along the periphery of the crown 33. Each pin 40 is slidably mounted in a hole provided in a plate 42 fixed at 43 to the crown 33. Belleville washers are inserted, in juxtaposition, between the plate 42 and the head 41 of the pin 40. The washers 44 are in such position relative to one another that, when the minimum distance mentioned above corresponds to the new condition of the frictional linings, the washers are at rest, while they become compressed as soon as a decrease of the distance due to the wear of the frictional linings occurs.

A spring 45, weaker than the washers 44, is inserted between the plate 42 and a stop 46 of the pin 40 so as to constantly apply the head 41 against the washers 44 resting against the plate 42 in order to avoid any noise or vibration when working.

The winding 24 and the supply current of the latter are normally provided in order to exert a suitable tightening effect when the gap provided between the poles A, B and pole C has the width corresponding to the new condition of the frictional linings. When these are worn, the gap is diminished but the increase of the tightening effect resulting therefrom is compensated by the resistance to compression of the Belleville washers 44. It is therefore a constant torque, independent of the condition of wear of the frictional linings which is transmissible by the clutch and the performance of the latter as a whole is not altered even after a protracted duration of service.

Perpendicularly to the frictional lining of the clutch (Figs. 1 and 2) a crown 47 of frictional cast iron is fixed by a screw 48 to the counter-plate 25 of the yoke, and a crown 49 of frictional cast iron is fixed by a screw 50 to the armature. The crowns 47 and 49 are disposed opposite to each other and are nearer the axis of the apparatus than the electromagnetic zones or poles A, B, C so that the magnetic circuit does not pass through the frictional linings but is spaced radially of the latter.

Figure 5:
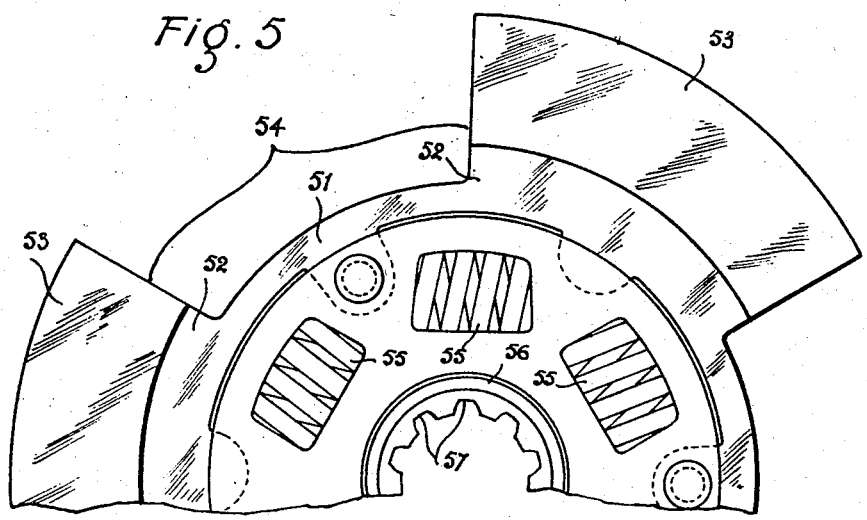
Fig. 5 is a partial view of the friction disc with vanes.
Figure 6:
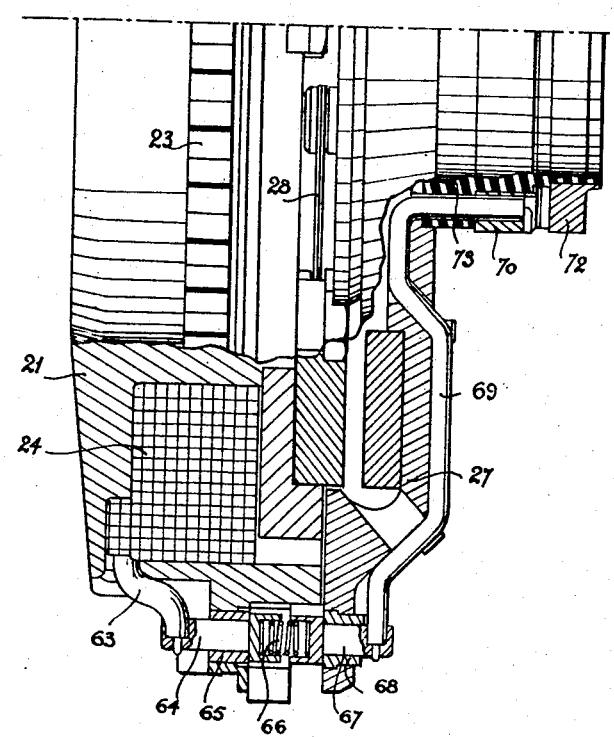
Fig. 6 is a view of the assemblage of the conductor for the supply of the winding of the clutch, in section along the line VI—VI of Fig. 2.

As shown in Figs. 1 and 5, a friction disc 51 is placed between the crowns 47 and 49 and has peripheral vanes 52 spaced by notches or void spaces 54, substantially of the same width as the vanes. Each vane 52 of the disc is provided on both its faces with a frictional lining 53. The disc 51 is mounted by means of springs 55 which damp any torsion on a hub 56 provided with grooves 57 and slidably mounted on the driven shaft 11 but rotatively solid with it.

The clutch is cooled by ventilation due to the arrangement of the vanes 52 of the frictional disc 51 when the latter rotates. In order to increase the efficacy of this forced ventilation, openings 58 (Figs. 1 and 2) are provided near the axis in a circular row in the yoke 21, while openings 59 and openings 60 are provided respectively in two circular concentric rows in the armature 27 on either side of the plate 49. Openings such as 61 may also be provided in the casing 20, preferably opposite the openings 60. A forced circulation of cooling air for the frictional surfaces, according to the arrows $f$ of Fig. 1, is created in this way with a suction of fresh air by the vanes 52 through the openings 58 and 59 and the centrifugal repelling of hot air through the openings 60.

It will be appreciated that the forced circulation of cooling air is caused by the vanes 52 as well during the periods of sliding of the clutch as during the periods when the clutch rotates in engagement, as a block. The greatest portion of the output of this circulation passes outside the gap owing to the outlet openings 60, so that the losses of load are reduced, an intense and efficacious ventilation being ensured under all circumstances. In this way an energetic and permanent cooling of the rubbing surfaces, and consequently of the frictional linings, is obtained, permitting the maintenance of the friction coefficient substantially constant and the considerable reduction of wear of the linings. For completing this favourable effect, which assumes a particular importance in the electromagnetic clutches of the type described, applicants have provided according, to the invention, linings 53 which have intrinsic qualities of high resistance to wear and to packing, notably at the beginning of the service of the lining.

According to the invention, the lining consists of the following calcined and precompressed materials:

| Material | Percentage limits in weight | Preferred percentage limits in weight |
| --- | --- | --- |
| Copper (Cu) | 63 to 80 | 68 to 73 |
| Lead (Pb) | 10 to 20 | 13 to 15 |
| Tin (Sn) | 5 to 9 | 6 to 8 |
| Graphite (G) | 6 to 12 | 8 to 10 |

Preferably, ten parts by weight of copper are provided for two parts of lead and one part of tin. The different ingredients of the lining are selected so as to be capable of passing through a sieve of 250 meshes per square inch.

The material of the lining is calcined directly on its support preliminarily coppered electrolytically with a layer of 0.02 to 0.03 mm. After shaping under a pressure of 1000 to 2000 Kg./cm.$^2$ heat is applied for 10 minutes between 600 and 650° C. in a reducing atmosphere, which produces a precalcination. The assemblages are then compressed under 2000 Kg./cm.$^2$ then again heated for 20 minutes at 800° C. in a reducing atmosphere, which produces the calcination. The assemblages are then compressed again under 2000 Kg./cm.$^2$ For the purpose of its electric supply, the winding 24 of the yoke 21 is soldered at one end at 62 (Fig. 1) to earth, while its other end 63 (Fig. 6) is connected to a socket 64 mounted on the yoke 21 in an insulating bushing 65. The socket 64 is connected by an elastic stud 66 to a second socket 67. The latter is mounted in an insulating bushing 68 on the armature 27 and is connected to a wire 69 soldered on a bronze collecting ring 70 of small diameter fixed coaxially (Figs. 1 and 6) by a washer 71 and a nut 72 round a flanged insulating sleeve 73, itself fixed by means of rivets 74 on the armature 27.

The ring 70, which has a small tangential speed, preferably less than 35 m./sec., owing to its small diameter, is in contact with a brush of metallo-graphite or carbon 75 pushed by a spring 76 and mounted in a tube 77 fixed to the casing 20. The carbon 75 is connected to the wire 78 of the supply to the winding 24. The latter is in this way efficaciously and without risks supplied, but the return to earth of the current of the winding at 62 by the flywheel 21 may have drawbacks such as pricks on the crankshaft 10 or on the bearings of the latter.

The winding 24 is arranged so that the rise of the current from the moment when the circuit is closed requires a relatively long delay for example between 0.2 and 1.2 seconds and preferably between 0.4 and 0.8 second for the current to reach 99% of its maximum value. In other words, the self induction and the constant of the winding 24 are provided so that the winding has intrinsically a high time constant. Due to this arrangement, the clutch is engaged progressively, which permits a smooth and efficacious working, particularly when passing through the speeds, even if due to the wear of the linings, the gap has varied to a certain extent.

In an alternative construction shown in Figs. 7 to 13, the arrangement is similar to that which has just been described with reference to Figs. 1 to 6, but comprises modifications of details which will be now described.

Figure 7:
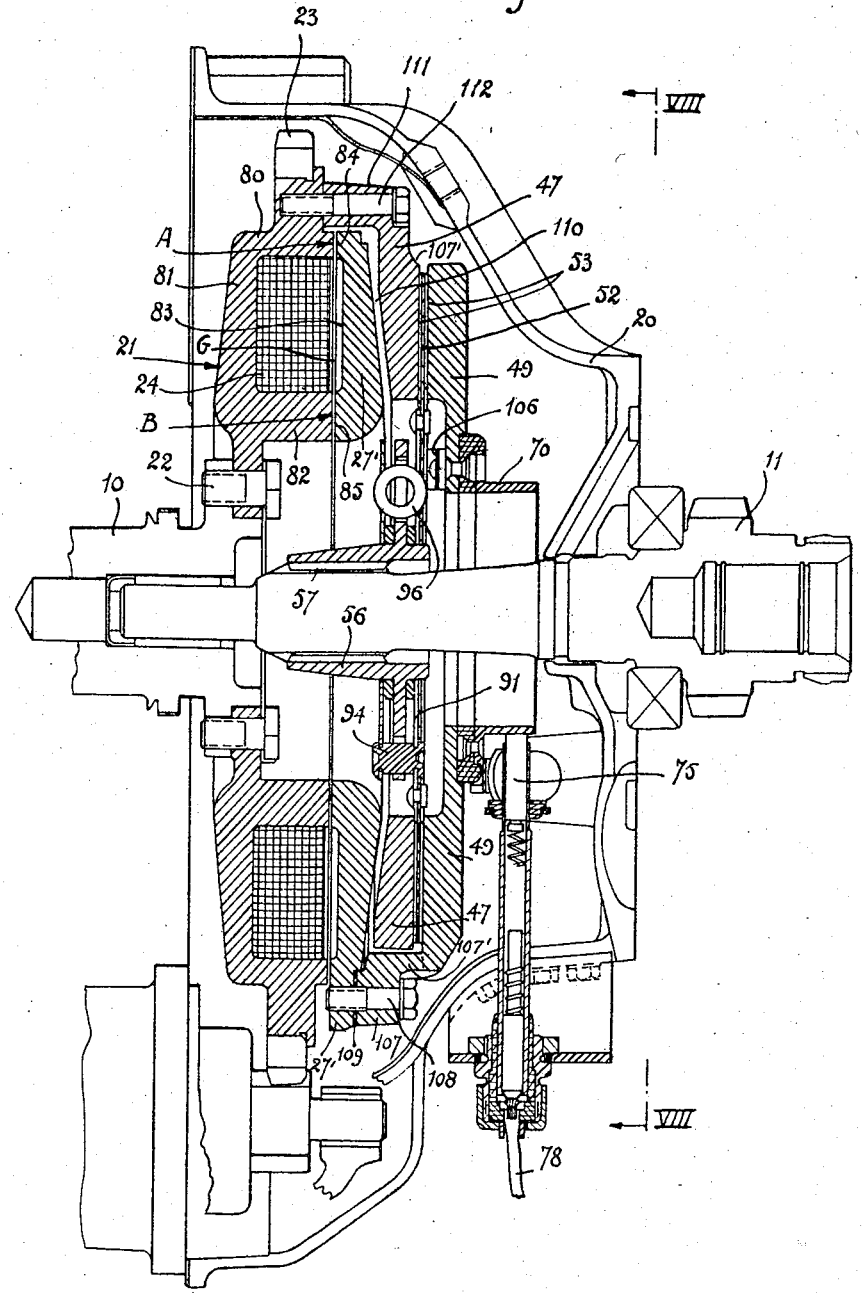
Fig. 7 is a view similar to that of Fig. 1 but concerning an alternative clutch, in longitudinal section along the line VII—VII of Fig. 8.
Figure 8:
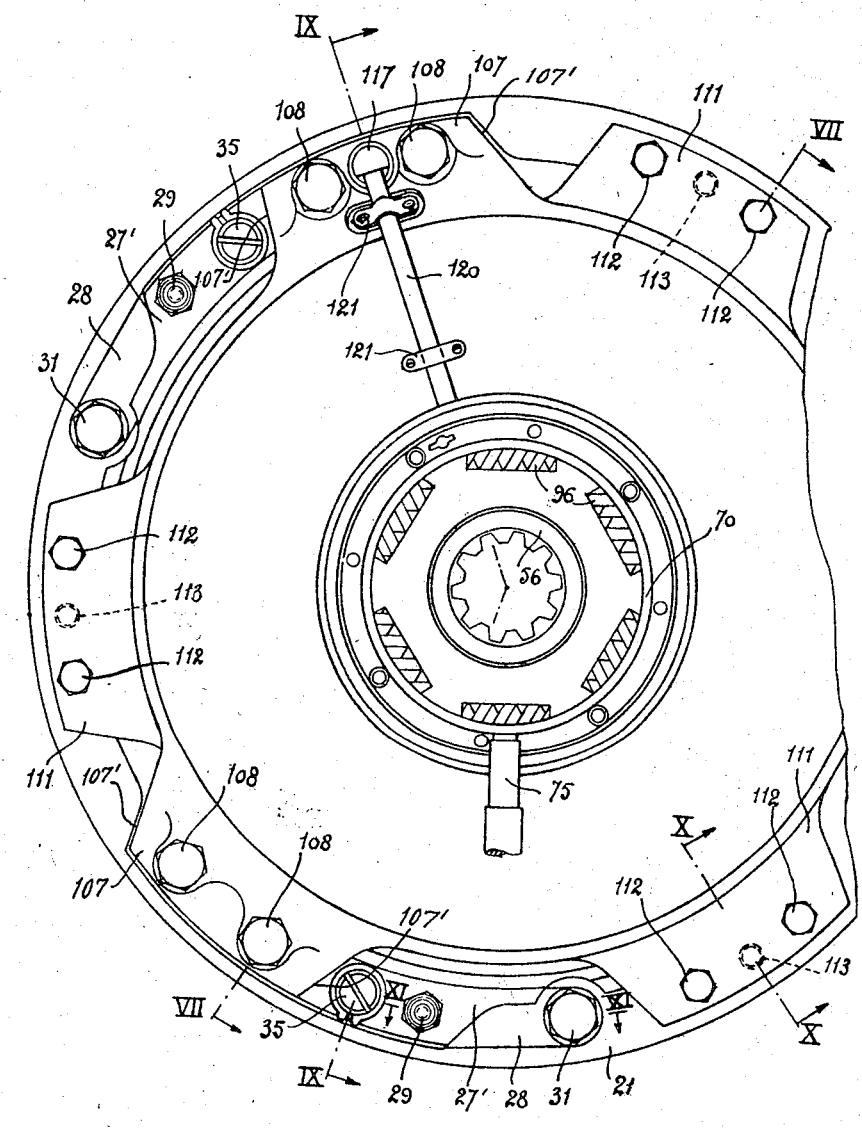
Fig. 8 is a front elevation view of the clutch of Fig. 7, according to the arrows VIII—VIII of Fig. 7, the casing being removed.
Figure 9:
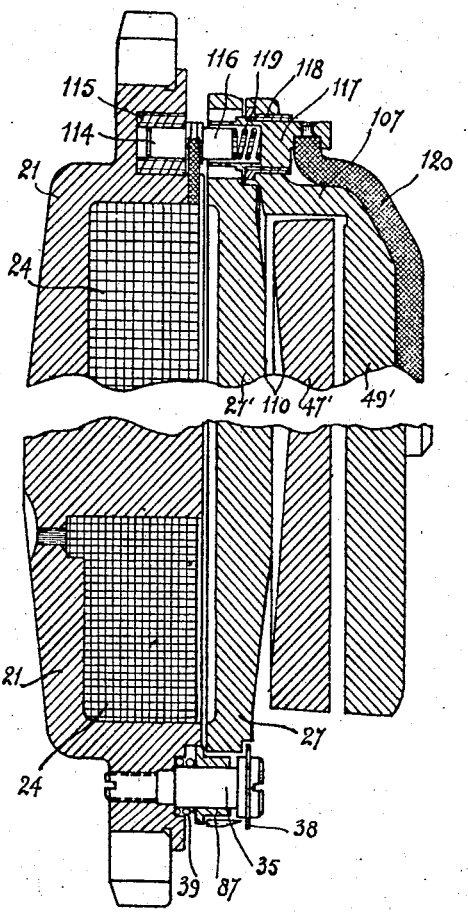
Fig. 9 is a partial view of the clutch of Fig. 7 in longitudinal section along the broken line IX—IX of Fig. 8.
Figure 10:
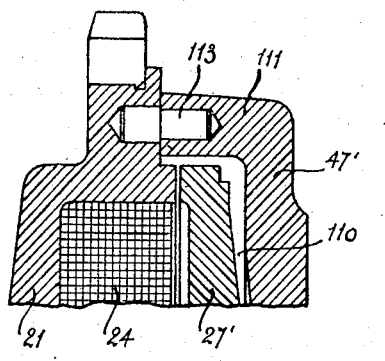
Fig. 10 is a partial view of the clutch of Fig. 7 in section along the line X—X of Fig. 8.

One will recognize in Fig. 7, at 10 the motor shaft, at 11 the driven shaft, coaxial with the shaft 10, at 20 the casing, at 21 the yoke-flywheel, at 22 the means for fixing the yoke on the shaft 10, at 23 the starting toothed crown mounted on the yoke, at 27 the armature, at 47 and 49 the tightening plates of the friction disc 52 with its linings 53, at 56 the hub of said disc slidably mounted due to grooves 57 on the driven shaft 11, at 70 the collecting ring of small diameter, at 75 the carbon brush, at 78 the conductor for the supply to the winding 24.

In the form shown in Figs. 7 to 13, the yoke 21 has a contour generally annular with a U-shaped radial section, with an external branch 80 and an internal branch 82 coaxial with the shafts 10 and 11 and connected by an intermediate branch 81 disposed transversally. The branches 80, 81, 82 form an annular recess in which is housed the winding 24 of the electromagnet.

The movable armature 27 of the electromagnet is disposed opposite the yoke and has the shape of a flattened washer in which is provided a shallow bowl 83 opposite the winding 24, this bowl forming an external annular boss 84 opposite the branch 80 and an internal annular boss 85 opposite the branch 82.

As is seen in Fig. 7, the thickness of the branches of the yoke and of the armature decreases as the distance from the axis of the electromagnet increases, so that the section of the passage available for the magnetic flux remains constant for the whole length of the magnetic circuit. Particularly, the surfaces of the annular pole face portion A formed at the end of the branch 80 opposite the boss 84 and of the annular pole face portion B formed at the end of the branch 82 opposite the boss 85 are equal.

It will be appreciated that this arrangement of electromagnet offers a particularly simple path and favorable to the lines of force around the winding, without change of direction nor change of cross-section.

Figure 11:
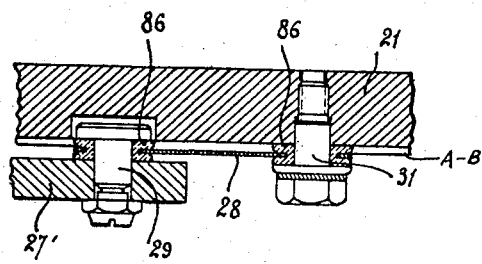
Fig. 11 is a partial view of the clutch of Fig. 7 in section along the line XI—XI of Fig. 8.

As previously stated, the armature 27′ forms with the yoke 21 a self-contained block and is connected to the latter in a solid manner in rotation but is free in limited axial displacements, its harnessing being composed of three strips 28 (Figs. 8 and 11) of spring steel. As shown in Fig. 11, each strip 28 is substantially coplanar with the pole face A–B of the yoke. Each strip extends between the yoke 21 and the armature 27 and is pivoted on the yoke by screw-washers 31 and pivoted on the armature by screw-nuts 29. The strip is situated outside the magnetic circuit and, in order to avoid any magnetic leakage, a non-magnetic double stamped washer 86 is inserted between each small plate, the corresponding screw and the support (yoke or armature). The screws 29 and 31 are disposed so that the strips work in tension in normal operation.

The amplitude of separation of the armature 27′ is limited (Fig. 9) by non-magnetic small pins 35 screwed in the yoke 21. Each small pin 35 passes freely through a hole provided in the armature and carries at its end a stop-washer 38. A spring 39, engaged round the small pin 35, extends between the yoke 21 and a flanged ring 87 resting against the armature 27′, and tends to place the latter in its position of maximum separation.

The minimum spacing between the armature and the yoke is fixed by the thickness of the clutch frictional lining. This clutch frictional lining and its tightening plates are completely distinct from the electromagnet and are disposed at a space on the side of the latter.

Figure 12:
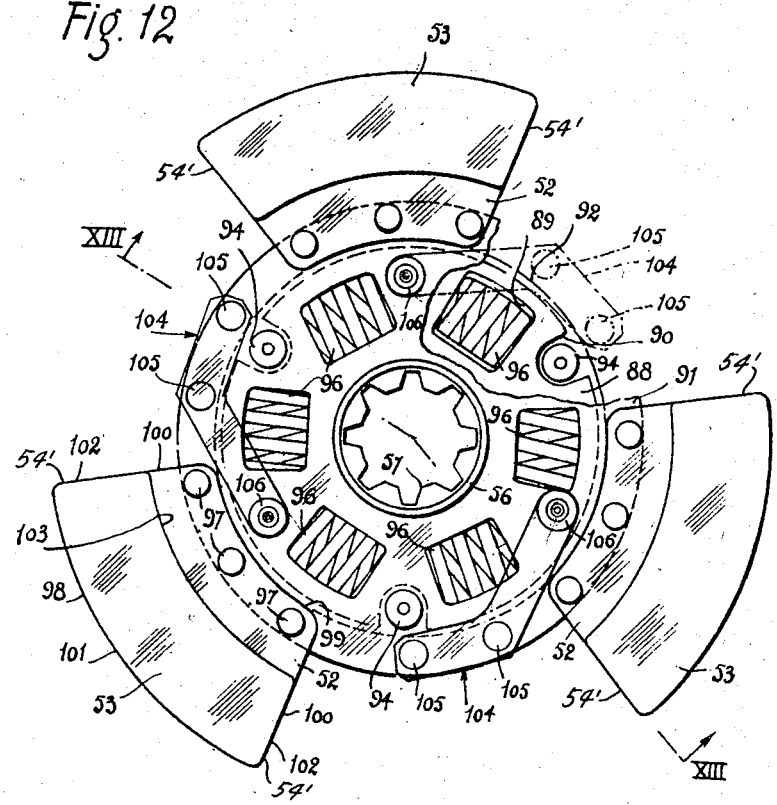
Fig. 12 is a view of the friction disc according to the arrows XII—XII of Fig. 13.
Figure 13:
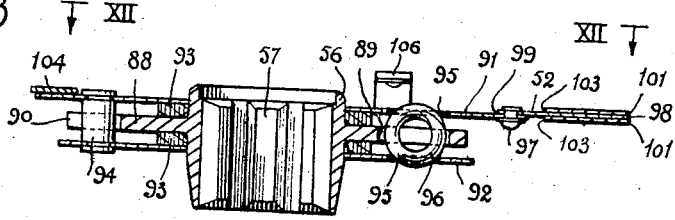
Fig. 13 is a view of this disc in section along the broken line XIII—XIII of Fig. 12.

It is seen that, in Figs. 12 and 13, at 56, the hub of the frictional disc the internal bore of which is grooved at 57 for coupling it with the shaft 11, has, solid with it, an annular collar 88, extending radially externally of this hub. Windows 89 are provided in the small collar 88 and are distributed in the vicinity and along the periphery of this small collar. In addition, peripheral notches 90, disposed opposite zones of the small collar which separate two adjacent windows 89 are provided in the small collar. In the example shown, six windows and three notches are provided.

On either side of the small collar 88 are disposed a disc 91 and a counter-disc 92 of annular shape. The latter, closely engaged around the hub 56, are separated from the small collar 88 by two washers 93 of frictional material and are applied by means of the washers against the small collar by rivets 94 of suitable length. The rivets 94, the number of which is equal to that of the notches 90, pass freely through these notches and are harnessed between the disc and the counter-disc, as shown.

Opposite the windows 89 of the small collar, windows 95 are provided in the disc and in the counter-disc, each opposite trio of windows opposite 89 and 95 receiving a spring 96 for the transmission of a dragging torque between discs, counter-disc and hub.

The counter-disc 92 has an external diameter substantially equal to the external diameter of the small collar 88, while the diameter of the disc 91 is greater than the common diameter of the small collar and the counter-disc.

Small identical metallic plates or vanes 52, spaced apart by void spaces 54′ and distributed on the periphery of the disc 91, are fixed by rivets 97 to the latter disc and extend substantially in the plane of and externally of the disc. Each small plate 52 has the shape of a curved frustum of a flat ring the external edges 98 of which and internal edges 99 of which are coaxial with the disc while the lateral edges 100 of the small plate are radial. On each of the two faces of each small plate 52 is fixed, for example by gluing, a rubbing lining 53. Each lining 53 has a curved shape the external curved edge 101 and the lateral edges 102 of which respectively coincide with the edge 98 and the edges 100 of the corresponding small plate 52, while the internal curved edge 103 of the lining is coaxial with the edge 99 and spaced towards the outside of the rivets 97 and of the periphery 99 of the disc 91.

In the example shown three small plates 52 with their linings are provided and are separated by spaces having substantially the same dimensions as the small plates.

The clutch disc so constructed is castellated on its periphery with projecting small plates carrying linings alternating with spaces, the rubbing surface formed by the linings being parcelled out into pieces spaced apart.

When the disc is pinched between the clutch plates, the peripheral small plates act like vanes of a fan and cause a forced air circulation which ensures an energetic and favourable cooling of the clutch.

It is to be noted that the elimination of matter corresponding to the spaces provided between the small plates lightens the clutch disc and diminishes notably its inertia since the gain of weight is obtained at the periphery of the disc. Furthermore, any corrective action on the friction surfaces is rendered easy by the relative independence enjoyed by each curved portion and is not prejudicial to the behavior of the central portion of the disc.

The facility with which small plates 52 with their linings 53 may be replaced by new small plates will also be appreciated, this replacement necessitating only the removal and the placing of rivets 97. It goes without saying that means similar to screw-nuts for the attachment may be provided instead of the rivets. It will also be understood that when the small plates 52 are not worn but the linings 53 alone are to be replaced, one can keep the small plates and only replace the linings. The latter, instead of being glued on the small plates may be fixed on the latter by riveting, by baking or any other suitable means.

Three flexible blades or arms 104 in spring steel (Figs. 7 and 12) are riveted at 105 on the disc 91 and carry at the end a riveted small cylindrical pellet-shaped head 106 in frictional material. These heads 106 are disposed so as to bear permanently against a plate 49 of the clutch (see Fig. 7) and due to the flexibility of the arms 104 provide a slight permanent friction between the driving assembly 21–27′–47′–49′ and the driven disc 91 thereby compensating the plays which exist in the transmission of the vehicle.

The friction disc is disposed (Fig. 7) between the plates 47' and 49'. The plate 49', in special frictional cast iron, extends opposite the linings 53 and is rigidly fixed to the armature 27' by three lugs 107 and by screws 108, spacing shims 109 being inserted between the lugs and the armature 27', while the lugs 107 surround the friction disc and the other tightening plate 47'. It will be seen on Figs. 7 and 8 that large air-passageways 107' are defined between the lugs 107 and surround the friction disc.

The tightening plate 47, inserted between the friction disc and the electromagnet, and spaced from the armature 27 by a notable distance 110, is in special frictional cast iron and is fixed to the yoke 21 by three lugs 111 and by screws 112. Positioning feet 113 (Figs. 8 and 10), disposed between these lugs and the yoke, ensure a rigorous centering of the plate 47'.

The electric current supply to the winding 24 takes place through a stud 114 (Figs. 8 and 9) imbedded in the yoke 21 and insulated from the latter by an insulating collar 115. Opposite the stud 114 is disposed a second stud 116 slidably mounted in a conducting socket 117. The latter is mounted, by means of an insulating collar 118 on one of the lugs of the plate 49' and receives a spring 119 which pushes the stud 116 constantly against the stud 114, whatever may be the width of the gap. A conductor 120 fixed by staples 121 to the external face of the plate 49' connects the socket 117 to an annular collector 70 carried by the plate 49' from which it is insulated. Against the collector 70 rubs the brush 75 connected by the conductor 78 to a source of current (not shown).

The operation is easily accomplished as will be seen from the preceding description. When some current is supplied to the conductor 78, the winding 24 is energized. The armature 27 is in this way attracted towards the winding and carries with it at the same time the plate 49 which tightens the linings 53 against the plate 47 which is maintained axially fixed by its connection at 112 with the yoke 21. In this way there is engagement of the clutch, the driven shaft 11 is carried along by the motor shaft 10. When the current is cut in the conductor 78, the armature is pushed back by the springs 39 of the yoke. The plate 49 moves away from the linings. The clutch disengages. In both engaged and disengaged positions of the clutch the vaned friction disc involves a circulation of air through the passageways 107'.

The winding 24 and the current to the latter are provided so as to ensure the normal tightening effort when the gap corresponds to a thickness of new linings 53.

It will be understood that, when the linings 53 are worn, the gap diminishes and the tightening effort would increase beyond the normal value if the current remained the same. By removing or changing the shims 109, a suitable value for the gap may be preserved notwithstanding a thinning of the linings due to wear, so that, for equal current, the tightening effort remains still substantially constant. Preferably the shims 109 comprise notches so as to be able to become engaged around the elements 108 with an easy operation.

The excellent arrangement of the magnetic circuit, the insulation, both thermal and magnetic, of the latter by the space 110 between the tightening plates, the air bath for cooling which circulates round the plates, the operation of the pellets 106, the convenient adjustment by shims 109 and the great simplicity of the clutch as a whole will be greatly appreciated.

Figure 14:
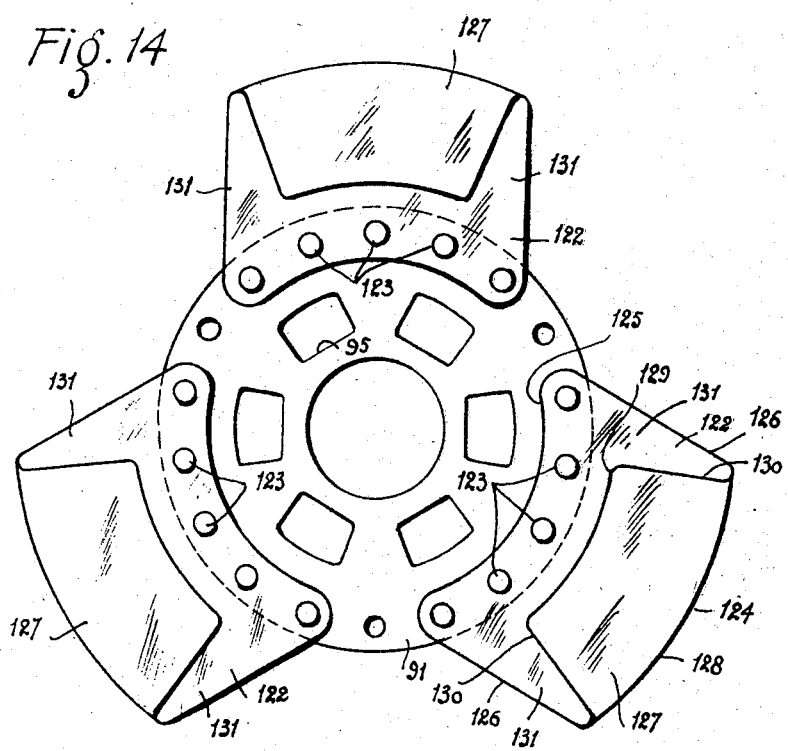
Fig. 14 is a view of an alternative construction of the friction disc, with some parts removed.

In Fig. 14 is represented an alternative construction of the friction disc 91 having windows 95 for receiving the springs which are damping the torsion. Small identical metallic plates 122, spaced apart and distributed on the periphery of the disc 91 are fixed to the latter by rivets 123 and extend normally in the plane and outside the disc. Each small plate 122 has the form of a curved frustum of flat ring the external edge 124 and internal edge 125 of which are coaxial with the disc, while the lateral edges 126 are parallel to the radial axis of symmetry of the small plates. On each of the faces of each small plate is fixed, for example by baking, a rubbing lining 127. Each lining has a curved form the external curved edge 128 of which coincides with the edge 124 of the corresponding small plate 122, and the curved internal edge of which, 129, is coaxial with the edge 125 and spaced towards the outside of the rivets 123 and of the periphery 125 of the disc. Each lateral edge 130 of a lining 127 is radial and defines with the neighbouring edge 126 of the small plate 122, a bare region 131 of the small plate, diverging towards the interior of the disc. In the example shown in Fig. 14, three small plates 122 with their linings are provided and are separated by spaces of sensibly the same dimensions as the small plates.

The entire assembly of the disc constitutes an efficacious fan for obtaining a forced cooling circulation in the clutch, as has been previously described with reference to Figs. 1 to 6 or to Figs. 7 to 13, but it has the further particular advantage of cooling very easily under the action of the air circulation which it causes. The bare regions 131 of the small plates are as a matter of fact directly subjected to this air circulation and, the small plates being good conductors of heat owing to their metallic nature, each lining 127 is surrounded on all sides by a cooling medium.

Figure 15:
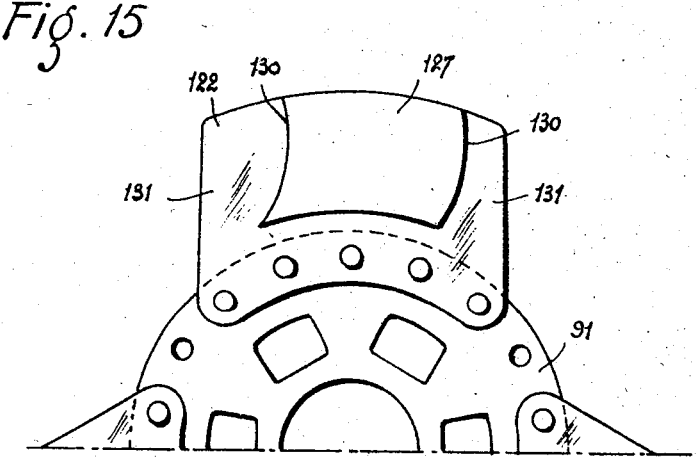
Fig. 15 is a half-view of another alternative construction of a friction disc, with some parts removed.

In the alternative construction of Fig. 15, the arrangement is similar to that which has just been described with reference to Fig. 14 having the disc 91, the small plates 122, and bare regions 131'. However, in the example of the Fig. 15, the lateral edges 130' of each lining 127' are curved to the inside so as to adopt the profile of a turbine blade for the purpose of improving the output of the forced air circulation.

It will be understood that the invention is not limited to the embodiments described and represented, but covers all the alternatives. Particularly, it goes without saying that several friction discs may be provided according to the invention, instead of one only.

What we claim is:

1. An electromagnetic clutch comprising an electromagnetic member provided with a coil arranged to be selectively energized, an armature member movable axially relative to and toward the electromagnetic member when the coil is energized, said members defining a magnetic gap, a first tightening plate axially spaced apart from both said members, a second tightening plate axially spaced apart from both said members and located farther therefrom than said first plate, a friction disc adapted to be gripped between said plates, first securing means for securing said first plate with the one of said members which is the farther therefrom, said first securing means including a plurality of peripheral axially projecting first lugs surrounding said gap, second securing means for securing said second plate with the other member, said second securing means including a plurality of peripheral axially projecting second lugs surrounding said disc and defining between said second lugs radial air passageways, said first securing means and said second securing means being alternated, connecting means for connecting said members and accommodating axial motion therebetween.

2. An electromagnetic clutch according to claim 1, wherein said gap is defined between opposite pole faces of said members and said connecting means include a plurality of long thin flexible strips substantially coplanar with the pole face of the electromagnetic member, and means for attaching the two ends of said strips to said members respectively.

3. An electromagnetic clutch according to claim 2, wherein said strips extend peripherally of said gap and are alternated with said first securing means.

4. An electromagnetic clutch according to claim 1, wherein said friction disc has peripheral vanes lined with frictional material and alternated with void spaces, the surface of each of said void spaces being at least equal to one fifth of the surface of each of said vanes, whereby said disc involves a circulation of air through said passageways.

5. In an electromagnetic clutch having an electromagnetic member provided with a coil arranged to be selectively energized, an armature member movable axially relative to and toward the electromagnetic member when the coil is energized, said members having opposite pole faces, said pole faces being substantially plane and perpendicular to the clutch axis and defining therebetween a variable permanent gap, two tightening plates secured to said members respectively, a friction disc adapted to be gripped between said plates, when the armature moves toward the electromagnetic member the combination with said members of a plurality of angularly spaced long thin flexible strips, said strips being disposed substantially coplanar with the pole face of the electromagnetic member, and means for attaching the opposite ends of the strips to the said members respectively, whereby said strips support and center the armature member and the plate secured thereto from and with respect to said electromagnetic member.

6. An electromagnetic clutch comprising an electromagnetic member, an armature member, said members having opposite pole faces defining a gap, connecting means for connecting said members and accommodating axial motion therebetween, two tightening plates secured to said members respectively, said members and said plates forming a driving assembly, a driven friction disc adapted to be gripped between said plates when the coil is energized and having frictional linings, a plurality of flexible arms secured to said disc, friction heads carried at the ends of said arms and providing a slight permanent friction relation between said disc and said assembly.

References Cited in the file of this patent
UNITED STATES PATENTS

| | | |
|---|---|---|
| 1,491,426 | Schunemann | Apr. 22, 1924 |
| 1,572,870 | Armstrong | Feb. 16, 1926 |
| 1,823,334 | Payne | Sept. 15, 1931 |
| 2,057,876 | Berry | Oct. 20, 1936 |
| 2,072,070 | Fisher | Feb. 23, 1937 |
| 2,408,430 | Lowey | Oct. 1, 1946 |
| 2,580,869 | Winther | Jan. 1, 1952 |
| 2,672,965 | Miller | Mar. 23, 1954 |
| 2,738,044 | Winther | Mar. 13, 1956 |
| 2,739,683 | Gamundi | Mar. 27, 1956 |

FOREIGN PATENTS

| | | |
|---|---|---|
| 617,406 | Great Britain | Feb. 4, 1949 |
| 136,877 | Sweden | Aug. 12, 1952 |